(12) United States Patent
Turner et al.

(10) Patent No.: US 6,669,219 B2
(45) Date of Patent: Dec. 30, 2003

(54) TELESCOPING SUSPENSION FORK HAVING A QUICK RELEASE WHEEL AXLE CLAMP

(75) Inventors: Paul H. Turner, Boulder, CO (US); Frank E. Vogel, Boulder, CO (US)

(73) Assignee: Maverick American LLC, Boulder, CO (US)

(*) Notice: Subject to any disclaimer, the term of this patent is extended or adjusted under 35 U.S.C. 154(b) by 3 days.

(21) Appl. No.: 10/120,474

(22) Filed: Apr. 10, 2002

(65) Prior Publication Data

US 2003/0193161 A1 Oct. 16, 2003

(51) Int. Cl.[7] .............................................. B62K 25/02
(52) U.S. Cl. ........................ 280/276; 280/279; 74/551.1
(58) Field of Search ................................. 280/276, 279, 280/271, 285, 286, 287; 74/551.1; D12/118

(56) References Cited

U.S. PATENT DOCUMENTS

| | | | |
|---|---|---|---|
| 4,561,669 A | * | 12/1985 | Simons ........................ 280/276 |
| 5,058,913 A | | 10/1991 | La Riviere et al. |
| 5,186,481 A | | 2/1993 | Turner |
| 5,215,324 A | | 6/1993 | Kawai |
| 5,238,259 A | | 8/1993 | Wilson et al. |
| D340,434 S | | 10/1993 | Hammer et al. |
| D344,253 S | | 2/1994 | Bishop et al. |
| 5,301,973 A | | 4/1994 | Truchinski |
| 5,417,446 A | | 5/1995 | Pileggi |
| D359,014 S | | 6/1995 | Haney et al. |
| 5,449,188 A | | 9/1995 | Ohma |
| 5,470,090 A | | 11/1995 | Stewart et al. |
| 5,509,674 A | | 4/1996 | Browning |
| 5,549,315 A | | 8/1996 | Ashman |
| 5,580,075 A | | 12/1996 | Turner et al. |
| 5,634,653 A | | 6/1997 | Browning |
| D391,530 S | | 3/1998 | Turner |
| D401,537 S | | 11/1998 | Turner |
| 5,848,675 A | * | 12/1998 | Gonzalez ................. 188/319.2 |
| 5,848,799 A | | 12/1998 | Huan |
| D406,083 S | | 2/1999 | Turner |
| 5,881,606 A | * | 3/1999 | Roddy ........................ 74/551.3 |
| 5,947,498 A | * | 9/1999 | Rajaee ........................ 280/276 |
| 5,957,244 A | | 9/1999 | Turner |
| 5,996,746 A | | 12/1999 | Turner et al. |
| 6,042,091 A | | 3/2000 | Marzocchi et al. |
| 6,095,541 A | | 8/2000 | Turner et al. |
| 6,105,987 A | | 8/2000 | Turner |
| 6,105,988 A | | 8/2000 | Turner et al. |
| 6,260,832 B1 | | 7/2001 | Vignocchi et al. |
| 6,260,931 B1 | | 7/2001 | Stewart |
| 6,290,304 B1 | | 9/2001 | Lashinske |
| 6,343,807 B1 | | 2/2002 | Rathbun |
| 6,409,281 B1 | | 6/2002 | Kanchisa et al. |
| 6,412,803 B1 | * | 7/2002 | Lalikyan et al. ............ 280/276 |
| 6,568,664 B2 | * | 5/2003 | Furuya .................... 267/64.26 |

* cited by examiner

*Primary Examiner*—Kevin Hurley
*Assistant Examiner*—Tony Winner
(74) *Attorney, Agent, or Firm*—Townsend and Townsend and Crew LLP

(57) ABSTRACT

A telescoping fork for the front wheel of a two wheel vehicle comprises a pair of outer tubes that each have a bottom end and a top end. An upper structural member and a lower structural member connect the outer tubes. Further, each outer tube tapers outwardly, both externally and internally, in a direction from the bottom end toward the lower structural member and from the top end toward the lower structural member. The structural members may attach to a top and bottom of a steering column.

16 Claims, 13 Drawing Sheets

TELESCOPING SUSPENSION FORK HAVING A QUICK RELEASE WHEEL AXLE CLAMP

BACKGROUND OF THE INVENTION

This invention relates generally to the field of two wheel vehicles. More specifically, the invention relates to two wheeled vehicle suspension systems and releasable wheel clamping systems.

The use of front and full suspensions in two wheeled vehicles has become widespread. For example, motorcycles have long had suspension systems. In recent years, front and full suspension systems in mountain bikes have become almost standard equipment. One pioneering effort to create such suspension systems was spearheaded by Rockshox, Inc. as described generally in U.S. Pat. Nos. 4,971,344; 5,186,481; 5,456,480; and 5,580,075, the complete disclosures of which are herein incorporated by reference. Another successful suspension system for a two wheeled vehicle is described in copending U.S. Applications Ser. Nos. 09/502,272 and 09/502,746, both filed Feb. 11, 2000, the complete disclosures of which are herein incorporated by reference.

This invention provides another type of suspension for two wheeled vehicles. The invention also relates to the releasable coupling of a wheel to the fork of a two wheeled vehicle.

SUMMARY OF THE INVENTION

In one embodiment, the invention provides a telescoping fork for the front wheel of a two wheeled vehicle. The fork comprises a pair of outer tubes that each have a top end and a bottom end. An upper structural member and a lower structural member are employed to connect the outer tubes, with the lower structural member being spaced below the upper structural member. Further, each outer tube tapers outwardly, both externally and internally, in a direction both from the top end and the bottom end toward the lower structural member. With such a configuration, the strength of the outer tubes is increased without significantly increasing the weight of the fork.

In one aspect, the lower structural member is welded to the outer tubes, and steering bearings are coupled between the upper structural member and the lower structural member. With this configuration, the steering bearings may be used to attach the fork to a vehicle frame. In another aspect, the lower structural member may have a hollow box sectional shape.

In one particular arrangement, the fork further includes a pair of inner tubes that are disposed to slide within the pair of outer tubes. The inner tubes each have a bottom end and a top end, and the bottom ends of the inner tubes extend out of the bottom ends of the outer tubes. In one option, a single bushing may be disposed between each outer tube and each inner tube. The bushings may be located at the bottom ends of the outer tubes and have a length that is longer than a diameter of the inner tube. The use of such a bushing helps maintain an oil layer between the bushing and the inner tube.

In another particular aspect, the fork may include a bracket disposed at the bottom end of each inner tube. The brackets are employed to clamp a front wheel axle to the inner tubes. Optionally, at least one of the brackets may have a mount for receiving a disk brake caliper.

Another feature of the fork is the use of a handle bar clamping device that is coupled to the upper structural member. In this way, a handle bar may be coupled to the fork.

One particular embodiment of the invention is an adjustable fluid damping system. The fluid damping system may comprise a damper tube extending upward from the top end of the inner tube (and in some cases the damper tube may simply be an extension of the inner tube), a hollow damper rod coupled to the top end of the outer tube and extending into the damper tube, and a damper piston valve coupled to the damper rod that seals against the damper tube. The fluid clamping system may further include a lock tube that is disposed within the damper rod. The damper rod may have at least one upper orifice and one lower orifice, and the lock tube may be rotatable from the top end of the outer tube to close the lower orifice to limit the amount of extension of the lower tube out of the upper tube. In this way, the amount of extension of the suspension system may easily be adjusted from outside of the fluid damping system. For instance, when ready to climb a steep hill, the rider may quickly adjust the lock tube by turning a knob to limit the amount of extension during climbing.

In one particular aspect, this is accomplished by configuring the damper piston valve as a one-way valve that permits fluid flow in an upward direction upon compression of the inner tube into the outer tube. Further, a sleeve may be disposed over a top portion of the damper rod and the lock tube. The sleeve is configured to close the upper orifice as the upper tube extends relative to the lower tube, such that further extension is prevented if the lower orifice is closed by the lock tube. Conveniently, a stop may be positioned between the top of the outer tube and the top of the inner tube to stop compression of the inner tube into the outer tube.

In one alternative aspect, the inner tube may have a closed end or section, and a sealed piston may be disposed inside the inner tube. The piston may be connected to a rod that extends and attaches to the top end of the outer tube. Further, a gas may be held within the inner tube and is compressed by the piston to provide a damping effect. Optionally, a spring may be disposed between the bottom end of the inner tube and the piston to form a biasing effect. The rod may also be hollow to permit the gas pressure in the inner tube to be adjusted by a valve at the top end of the outer tube.

In a further embodiment, the invention provides a releasable clamp system for clamping a wheel axle of wheel to a two-wheeled vehicle. The clamp system comprises a frame member that defines a shape that is configured to receive a portion of the wheel axle. A cover plate is pivotally attached to the frame member and is configured to receive another portion of the wheel axle. In this way, the cover plate may be moved to a closed position where the frame member and the cover plate generally encompass and clamp the wheel axle, and to an open position where the wheel axle may be removed. A lever is pivotally attached to the cover plate, and a hook member is pivotally attached to the lever. The hook member is configured to hook onto the frame member and be pulled by the lever to secure the cover plate to the frame member when the cover plate is moved to the closed position.

In one aspect, the cover plate may be pivotally attached to a top end of the frame member to permit the wheel axle to be vertically released from the frame member. In another aspect, the inner surfaces of the frame member and the cover plate that are adjacent the wheel axle are each semi-circular in geometry.

In a further aspect, the hook member may be T-shaped, and the frame member may include a shoulder with a slot into which the hook member is received. Optionally, the hook member may be constructed of two pieces that are threadably connected together. In this way, the clamping force on the wheel axle may be adjusted by rotating the pieces relative to each other prior to clamping.

In yet another aspect, torsion springs may be provided at pivot points located where the cover plate attaches to the frame member and where the lever attaches to the cover plate. The torsion springs hold the cover plate open when not clamping the wheel axle. Further, a mount may be provided on the frame member to mount a disk brake caliper to the frame member.

DETAILED DESCRIPTION OF THE INVENTION

In one aspect, the invention provides various suspension systems having a variety of features. One such feature is the use of fork that is constructed of telescoping outer tubes. The tubes have an inner diameter and an outer diameter that both increases in a direction from the axle mount upward as well as from the top of the fork downward. The maximum amount of taper may occur near where the two tubes are joined together by a structural member. For example, the tubes may taper outward from an inner diameter in the range from about 32 mm to about 34 mm and an outer diameter in the range from about 34 mm to about 38 mm, to an inner diameter in the range from about 44 mm to about 48 mm and an outer diameter in the range from about 48 mm to about 52 mm, although other dimensions are possible. Such a configuration increases the strength of the fork without appreciably increasing its weight.

Another feature of the invention is the ability to limit the amount of extension of the suspension system. This may be done manually from outside of the suspension system. For example, such an adjustment may be done by simply turning a knob. Such a feature is useful when peddling uphill to keep the front end of the bicycle closer to the ground to prevent tipping backward. When on level or down sloping terrain, the suspension system may again be adjusted to permit full extension.

A further feature is a releasable clamp system that provides for a quick release of the wheel from the fork. By the simple operation of a lever, the wheel may be vertically released from the fork.

Figure 1:
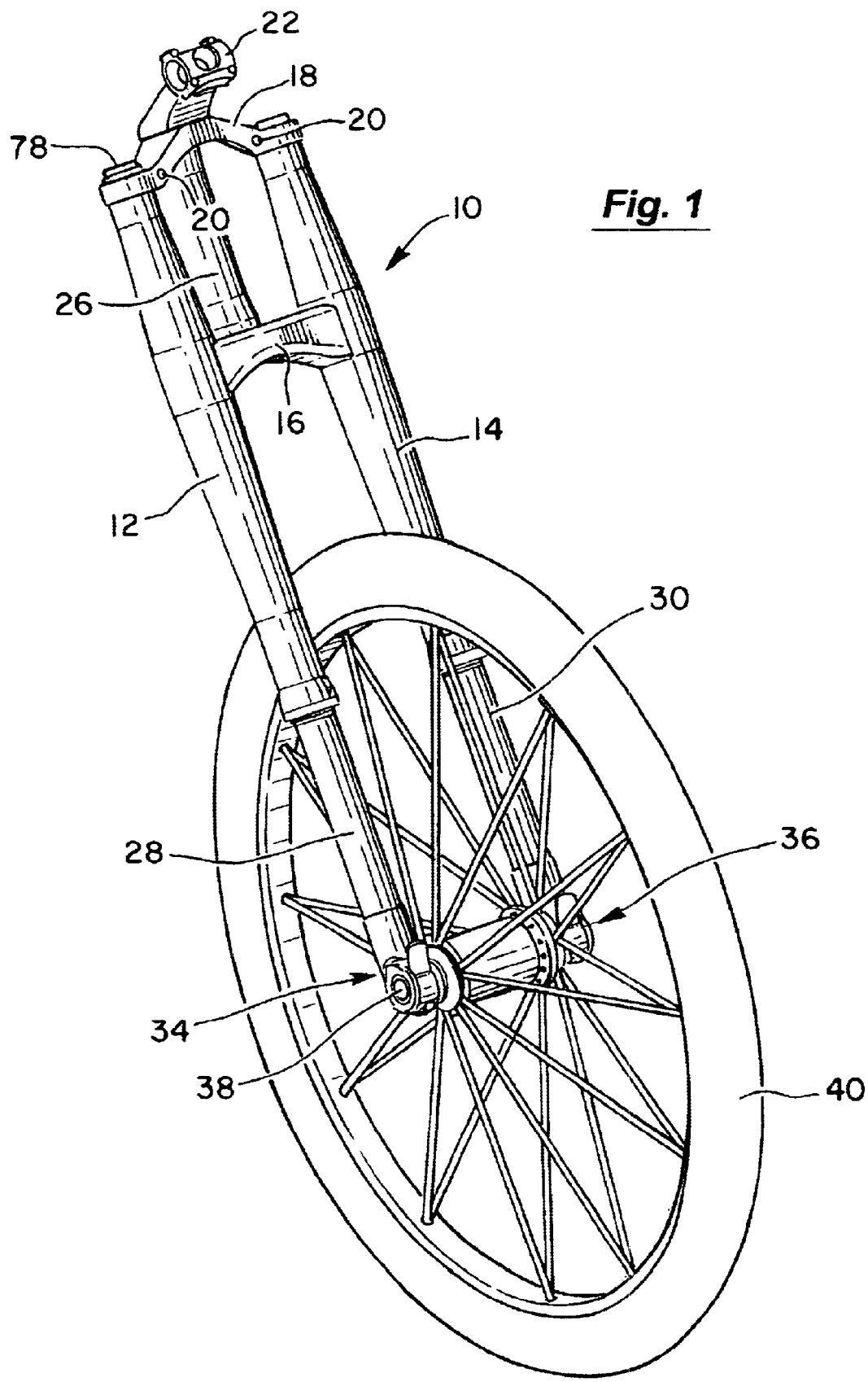
FIG. 1 is a front isometric view of a telescoping fork releasably coupled to a front wheel of a two wheeled vehicle according to the invention.
Figure 2:
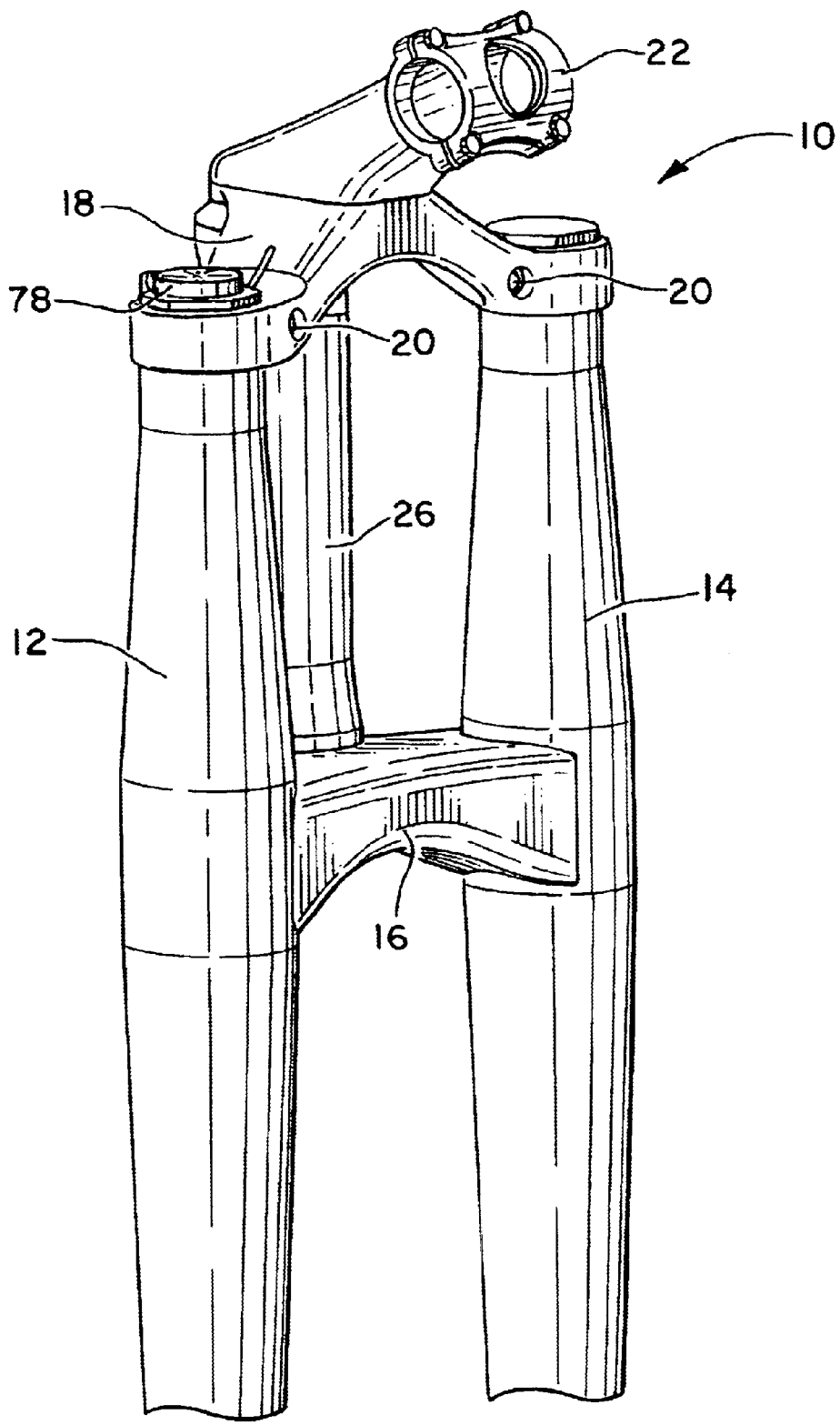
FIG. 2 is a more detailed view of a top portion of the fork of FIG. 1.
Figure 3:
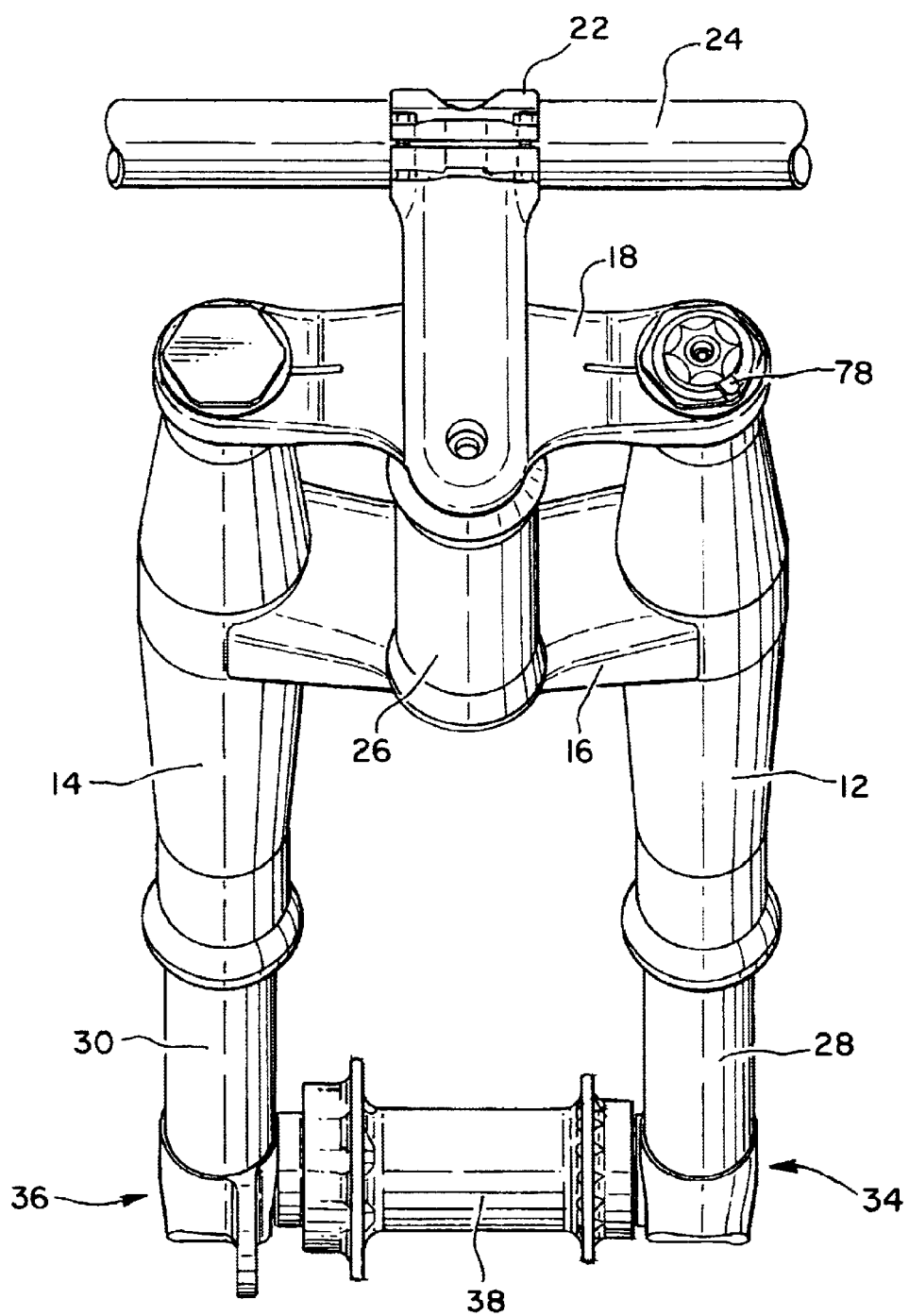
FIG. 3 is a rear isometric view of the fork of FIG. 1 shown coupled to a handle bar.

Referring now to FIG. 1, one embodiment of a fork 10 of a two-wheeled vehicle will be described. Fork 10 is constructed of a pair of outer tubes 12 and 14 that may both be fashioned in a substantially similar manner. Outer tubes 12 and 14 are coupled together by a lower structural member 16 and an upper structural member 18. Outer tubes 12 and 14 may be constructed of a strong and rigid material, such as steel, aluminum, or the like. Lower structural member 16 may be constructed of a similar material and may be welded to outer tubes 12 and 14. Upper structural member 18 may be coupled to tubes 12 and 14 using screws 20 (see also FIG. 2) that may be tightened or loosened using an allen wrench. Alternatively, upper structural member 18 may be welded to tubes 12 and 14. Upper structural member 18 also includes a coupling arrangement 22 for coupling a handlebar 24 (see FIG. 3) to fork 10. Optionally, this may be incorporated directly into upper structural member 18.

Coupled between structural members 16 and 18 is a rotatable member 26 having steering bearings. Rotatable member 26 is a steering column that is configured to be coupled to a vehicle frame as is known in the art to complete the vehicle.

Extending out of outer tubes 12 and 14 are inner tubes 28 and 30. Inner tubes 28 and 30 are slidable within outer tubes 12 and 14 and are coupled to a clamping system 34, 36 as described hereinafter. As also described hereinafter, an adjustment knob 78 is at a top end of outer tube 12 and may be used to adjust the amount of extension of inner tubes 28 and 30 out of outer tubes 12 and 14.

Coupled to inner tubes 28 and 30 are clamp systems 34 and 36 that are each substantially identical. Clamp systems 34 and 36 are employed to couple an axle 38 of a wheel 40 to fork 10 and will be described in greater detail hereinafter.

Figure 4:
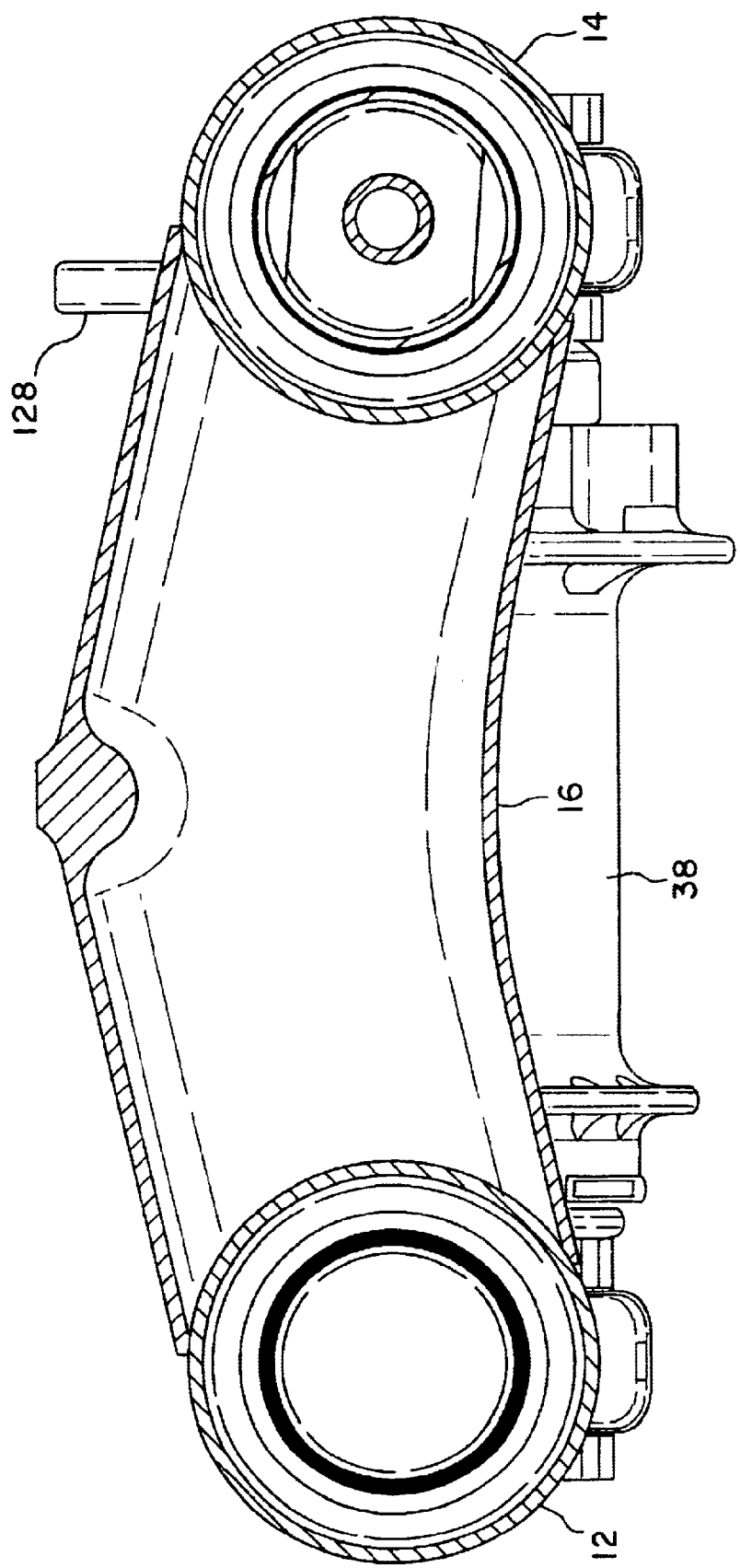
FIG. 4 is a cross-sectional top view of the fork of FIG. 1 taken through a lower structural member.

Lower structural member 16 is shown in cross section in FIG. 4 and has a box sectional shape. Such a shape is useful in that it provides the greatest amount of rigidity for the least weight.

Figure 5:
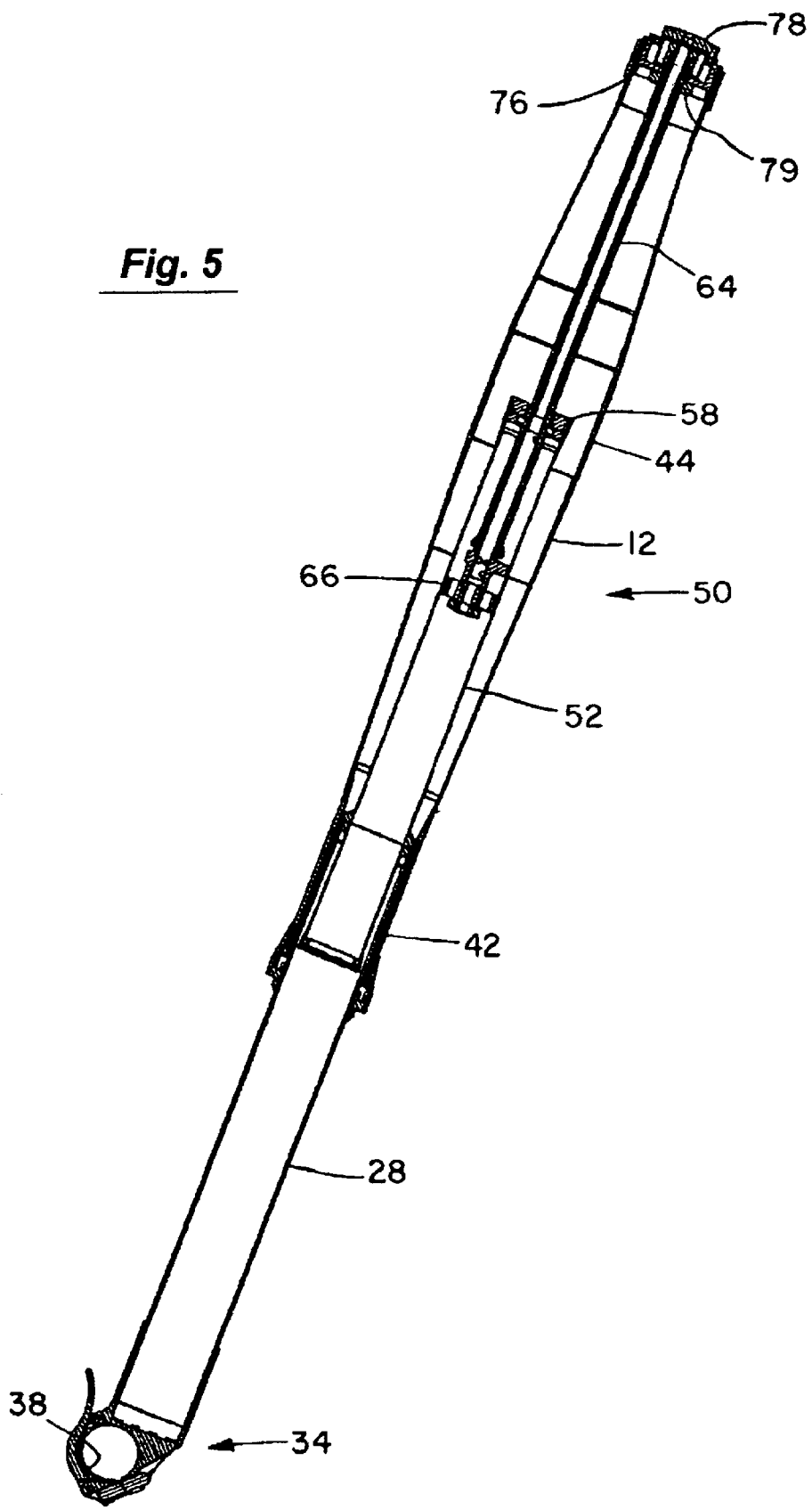
FIG. 5 is a cross-sectional side view of the fork of FIG. 1

As best shown in FIG. 5, outer tube 12 (as well as outer tube 14) tapers outward, both externally and internally, from near its bottom end 42 to a location 44 where tube 12 is coupled to lower structural member 16 (see FIG. 1). Outer tube 12 also tapers outward, both externally and internally from its top end to location 44. This configuration permits outer tube 12 to have an inner diameter at bottom end 42 that is slightly larger than inner tube 28, and to have a greater inner diameter at location 44 where greater stresses occur. In this way, the overall strength of fork 10 is increased. Further, by also increasing the outer diameter of tube 12, a relatively small wall thickness may be maintained to reduce the weight of fork 10.

Figure 6:
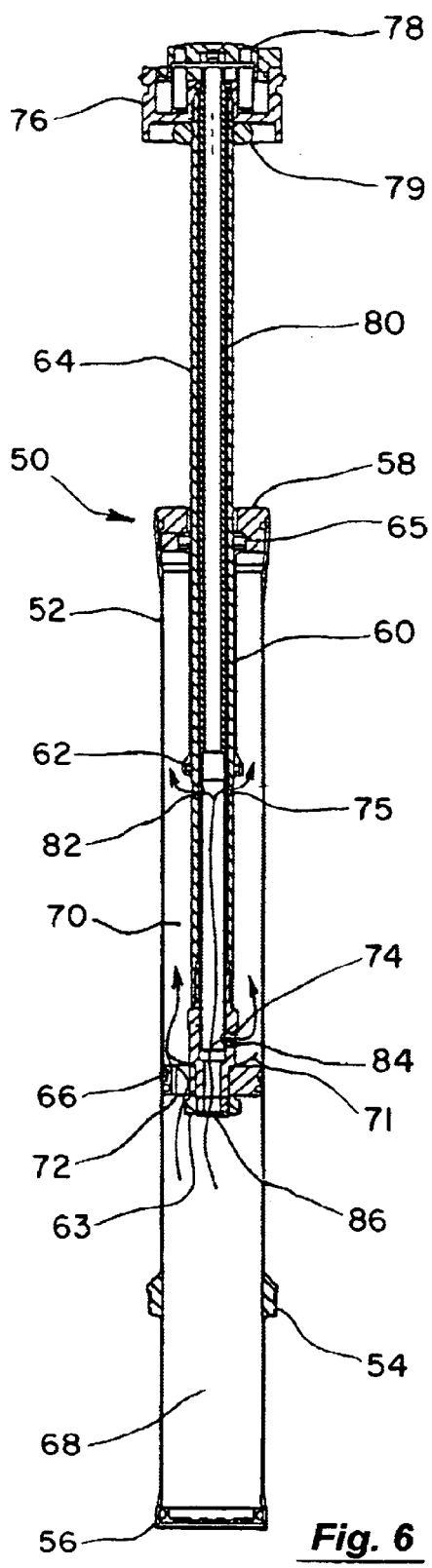
FIG. 6 is a more detailed view of some of the components of the fork of FIG. 5 showing fluid flow during compression.
Figure 7:
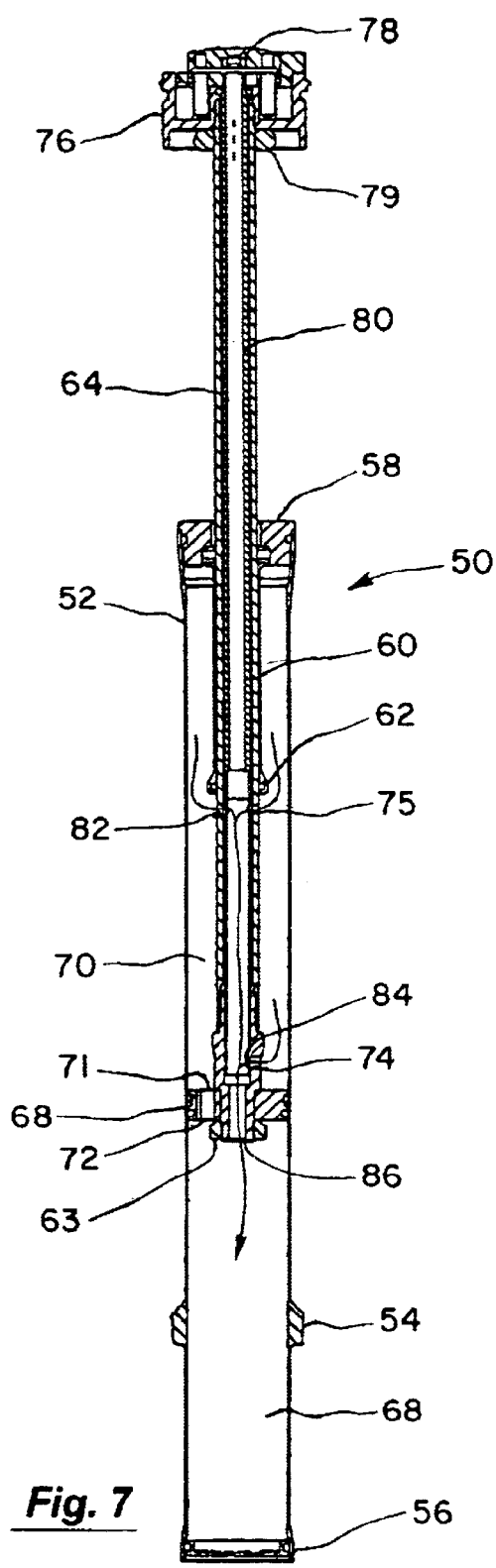
FIG. 7 illustrates the components of FIG. 6 showing fluid flow during extension.

Referring to FIGS. 5–7, construction and operation of a damping system 50 will be described. Damping system 50 is constructed out of outer tube 12 and inner tube 28 that slides within outer tube 12. Inner tube 28 is coupled to a damper tube 52 that has threads 54 that thread into corresponding threads of inner tube 28. Damper tube 52 has a closed bottom end 56 and a top end having a seal head 58. In some cases, damper tube 52 may simply be an integrally formed extension of inner tube 28. Extending down from seal head 58 and into damper tube 52 is an outer sleeve 60. An O-ring 62 is coupled to the bottom end of outer sleeve 60. Extending through outer sleeve 60 and seal head 58 is a hollow damper rod 64. An O-ring 65 provides a seal between seal head 58 and damper rod 64. Coupled to a bottom end of damper rod 64 by a nut 63 is a damper valve piston 66 that is configured as a one-way valve. Piston valve 66 also divides damper tube 52 into a lower oil chamber 68 and an upper oil chamber 70, although other fluids may be used as well. Piston valve 66 includes a flexible valve washer 71 that is shown in an open position in FIG. 6 during compression of damping system 50 to permit fluid flow through a valve 72. As shown in FIG. 7, washer 71 is an a closed position during extension of damping system 50 to prevent flow through orifice 72. Disposed above piston valve 66 is a bottom extension orifice 74 (although more than one may be used). Also, positioned above bottom orifice 74 is one or more top extension orifices 75.

Coupled to a top end of damper tube 64 is a top cap 76 that in turn is coupled to outer tube 12 (see FIG. 5). A bottom out pad 79 is coupled to top cap 76 and may comprise an O-ring. Pad 79 is used to soften the impact and protect top cap 76 if damping system 50 bottoms out, i.e., when seal head 58 reaches top cap 76. Optionally, pad 79 may be provided anywhere along damper rod 64, and damper rod 64 may be provided with a shoulder to hold pad 79 in place. Disposed on top of top cap 76 is an adjuster knob 78 that in turn is coupled to a lock tube 80. In turn, lock tube 80 is adjacent to and coaxially disposed within damper rod 64. Knob 78 is rotatable to rotate lock tube within damper rod 64. Lock tube 80 also includes a set of upper orifices 82 that are aligned with top orifices 75 of damper rod 64. Orifices are preferably configured as slots so that when knob 78 is rotated, a fluid flow path remains through damper rod 64 and lock tube 80.

Lock tube 80 also includes a lower orifice 84 that is aligned with bottom extension orifice 74 of damper rod 64. Upon rotation of knob 78, orifice 84 may be rotated out of alignment with orifice 74 so that fluid flow between upper oil chamber 70 and the interior of damper rod 64 through orifice 74 is prevented when orifice 75 passes above O-ring 62. Damper rod 64 also includes an opening 86 at its bottom end that permits fluid to flow both into and out of damper rod 64.

By utilizing lock tube 80, damper system 50 may be operated in one of two modes simply by rotating knob 78. In FIGS. 6 and 7, damper system 50 is shown in an unrestricted mode where orifice 84 is aligned with orifice 74. In FIG. 6, damper system 50 is being compressed, such as when a rider encounters a bump. In such cases, inner tube 28 slides into outer tube 12. Since damper tube 52 is coupled to inner tube 28 and top cap 76 is coupled to outer tube 12, damper rod 64 and lock tube 80 move further into damper tube 52. In so doing, the fluid within lower chamber 68 moves upwardly through valve orifice 72 and into upper chamber 70, as well as upwardly through damper rod 64 as shown by the flow lines in FIG. 6. The fluid flowing upward through damper rod 64 may exit into upper chamber 70 through orifices 74 or 75 as shown. The "stiffness" of damping system 50 during compression may be varied by varying the flexibility of valve washer 71, as well as the number and/or size of the exit orifices.

During extension (as shown in FIG. 7), valve washer 71 is forced downward to close orifice 72. As such, fluid in upper chamber 70 may only pass into lower chamber 68 through damper rod 64 as shown by the flow lines. If the amount of extension becomes so great that orifices 75 move within outer sleeve 60, fluid in upper chamber 70 may still pass into lower chamber 68 through orifices 74 and 84.

Damper system 50 may be placed into an extension limiting mode by simply turning knob 78 until orifice 84 is out of alignment with orifice 74. In this configuration, lock tube 80 prevents fluid flow through orifice 74 and into damper rod 64. Hence, once damper system 50 extends sufficient to move orifice 75 beyond O-ring 62, outer sleeve 60 prevents fluid flow from upper chamber 70 and into damper rod 64 via orifice 75. Moreover, because orifice 74 also is closed, none of the fluid in upper chamber 70 may pass into lower chamber 68 is prevented, thus stopping further extension.

Hence, a rider may quickly and easily control the amount of extension simply by rotating knob 78 which is easily accessible since it is outside of outer tube 12. For example, when climbing a hill a rider may want to keep the front end of the bicycle closer to the ground. To do so, knob 78 may simply be turned to limit the amount of extension. When at the top of the hill, knob 78 may be moved back to place damping system 50 in normal operation. As will be appreciated, the amount of extension may also be controlled by the number, size and/or location of orifices 75. For example, by moving orifices downward, more extension may be achieved.

Figure 8:
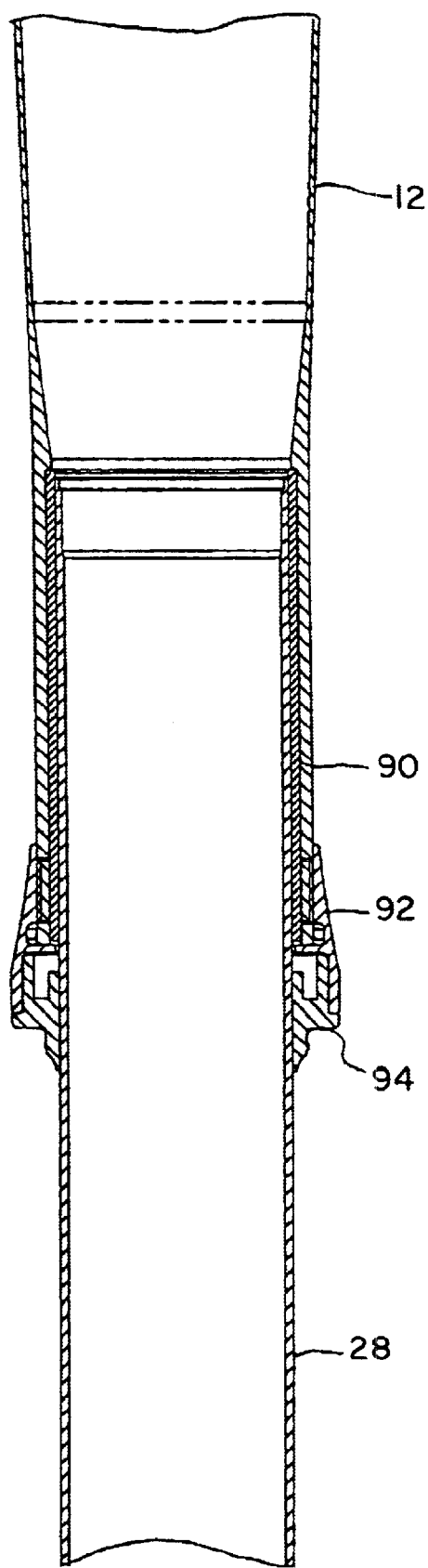
FIG. 8 is a more detailed view of a bushing disposed between an outer tube and an inner tube.
Figure 9:
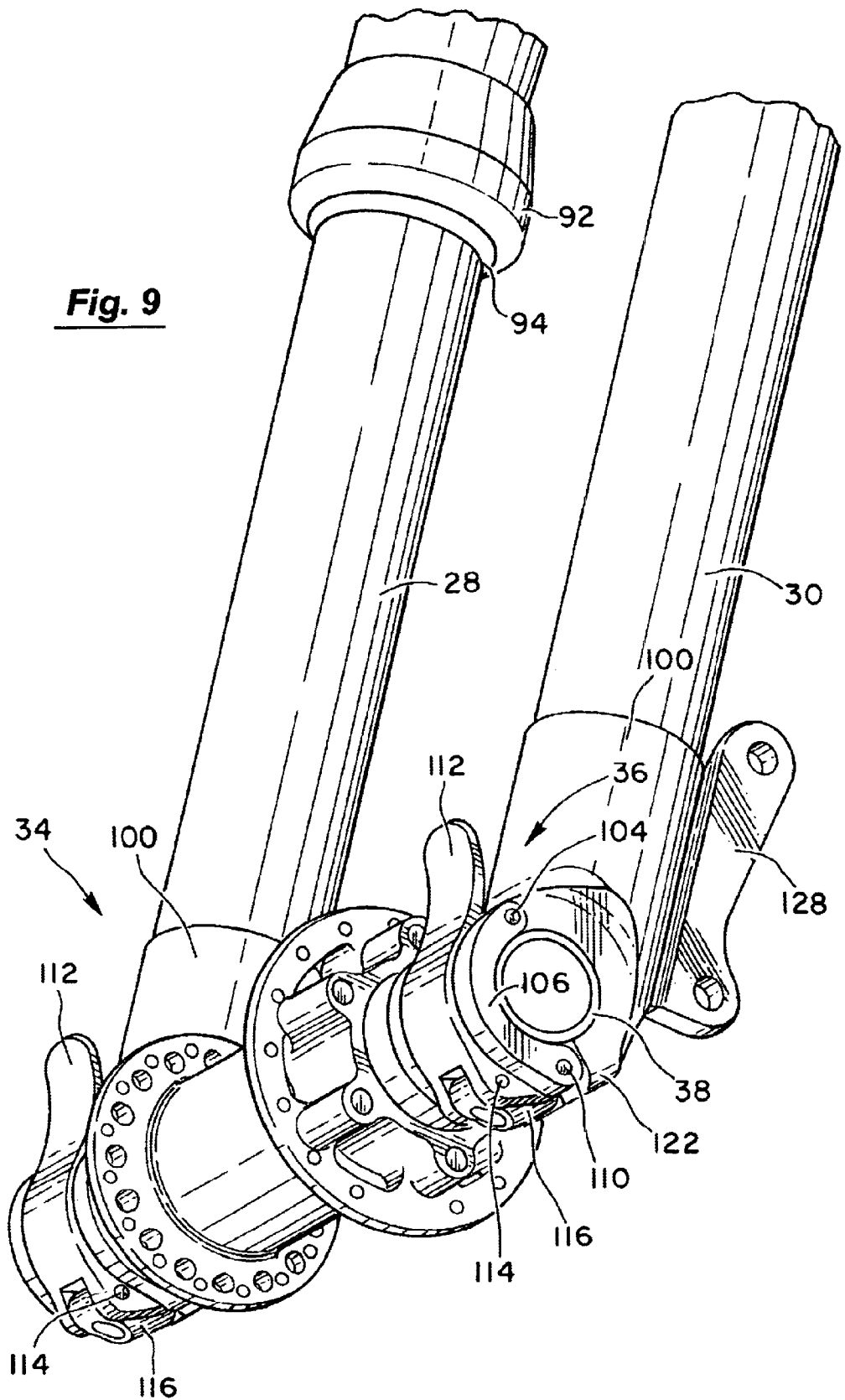
FIG. 9 is a more detailed view of a clamp system of the fork of FIG. 1.

FIG. 8 illustrates the slidable connection between inner tube 28 and outer tube 12. For convenience of illustration, damper system 50 has been removed. Coupled to outer tube 12 is a bushing 90 that is held in place by a sheath member 92. Also coupled to sheath member 92 is a seal or dust wiper 94 that helps prevent dirt and other particulate from passing between inner tube 28 and outer tube 12. Bushing 90 is configured to maintain a layer of oil between itself and inner tube 28 during compression and expansion This is accomplished by using only a single bushing so that edges do not exist between multiple bushings. Further, bushing 90 has a length that is longer than the diameter of inner tube 28. This length also helps to maintain the oil layer.

Referring now to FIGS. 9–12, clamp systems 34 and 36 will be described in greater detail. Clamp systems 34 and 36 are constructed of identical components and will each be described using the same reference numerals. Clamp system 34 is constructed of a frame member 100 that is coupled to inner tube 28. Frame member 100 has an inner surface 102 for receiving wheel axle 38 and may be approximately semi-circular in shape, although other shapes are possible. Pivotally attached to frame member 100 by a pivot pin 104 is a cover plate 106 that also has an inner surface 108 for receiving the other half of wheel axle 38. As such, inner surface 108 may also be approximately semi-circular. Pivotally coupled to cover plate 106 by a pivot pin 110 is a lever 112, and pivotally coupled to lever 112 by a pivot pin 114 is a hook member 116. Hook member 116 is constructed of a housing 118 and a hook 30 120 that is T-shaped. Hook 120 is threadably connected to housing 118 to permit the distance between hook 120 and lever 112 to be adjusted.

Figure 10:
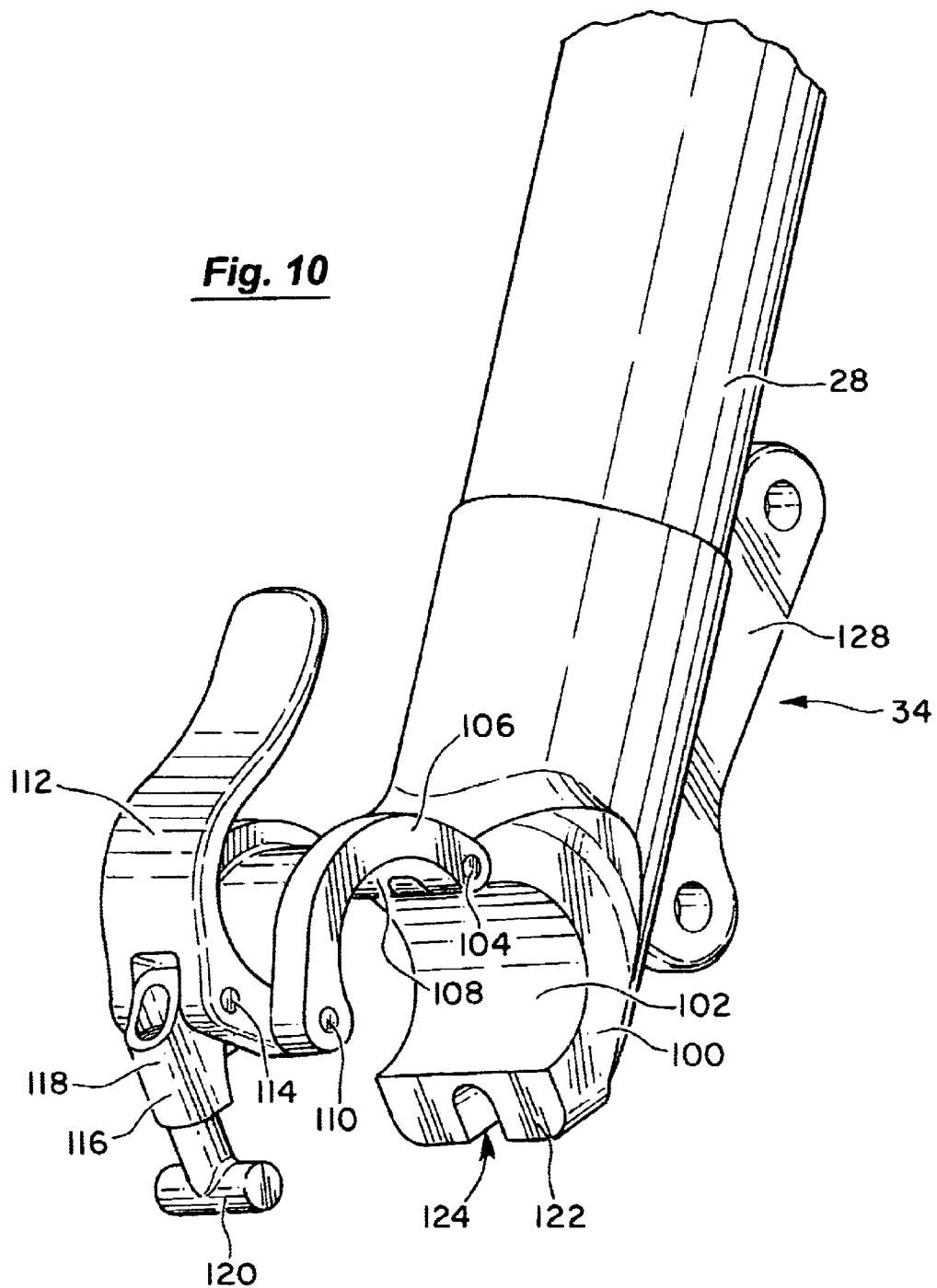
FIG. 10 illustrates the clamp system of FIG. 9 in an open position.
Figure 11:
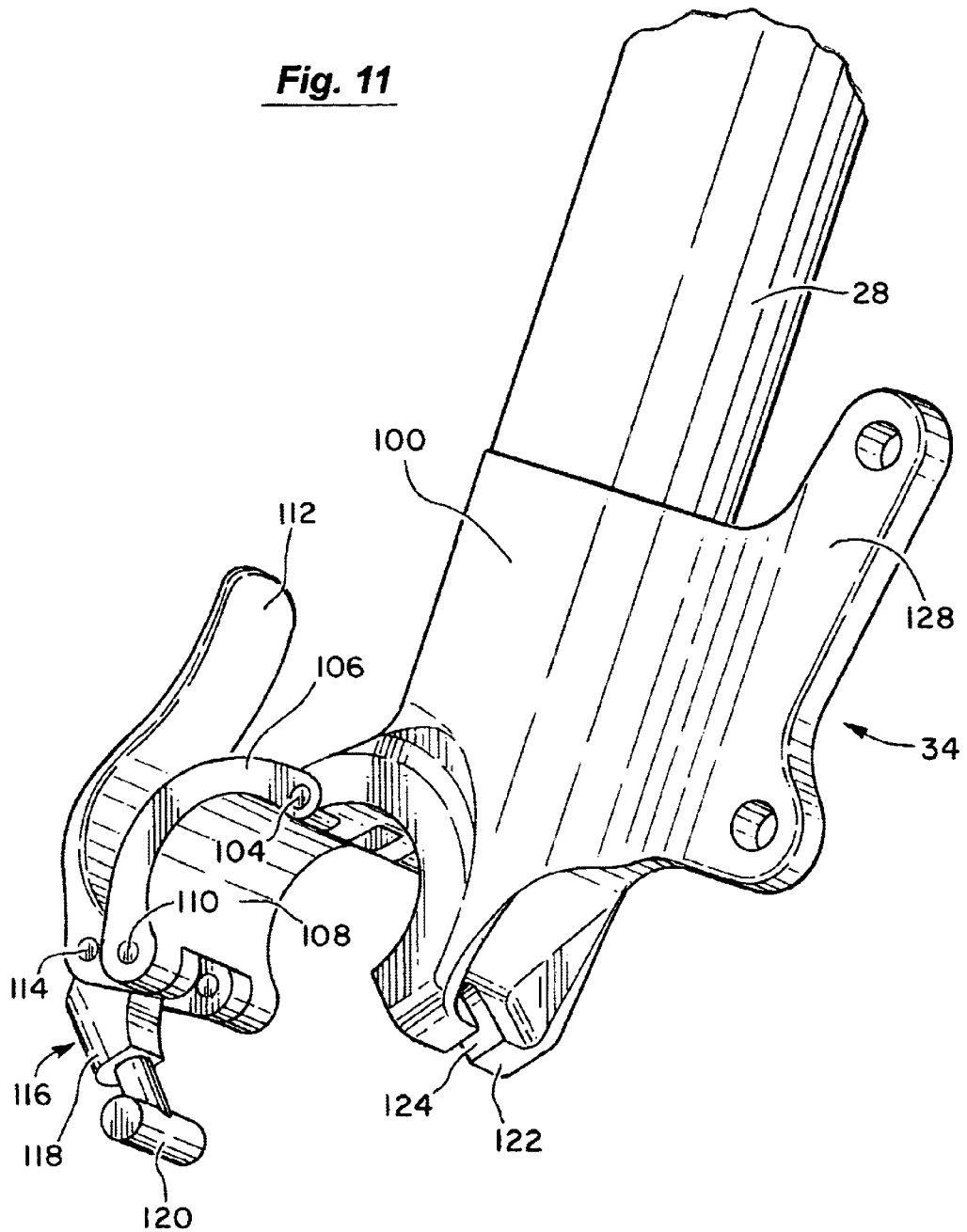
FIG. 11 is another view of the clamp system of FIG. 10.
Figure 12:
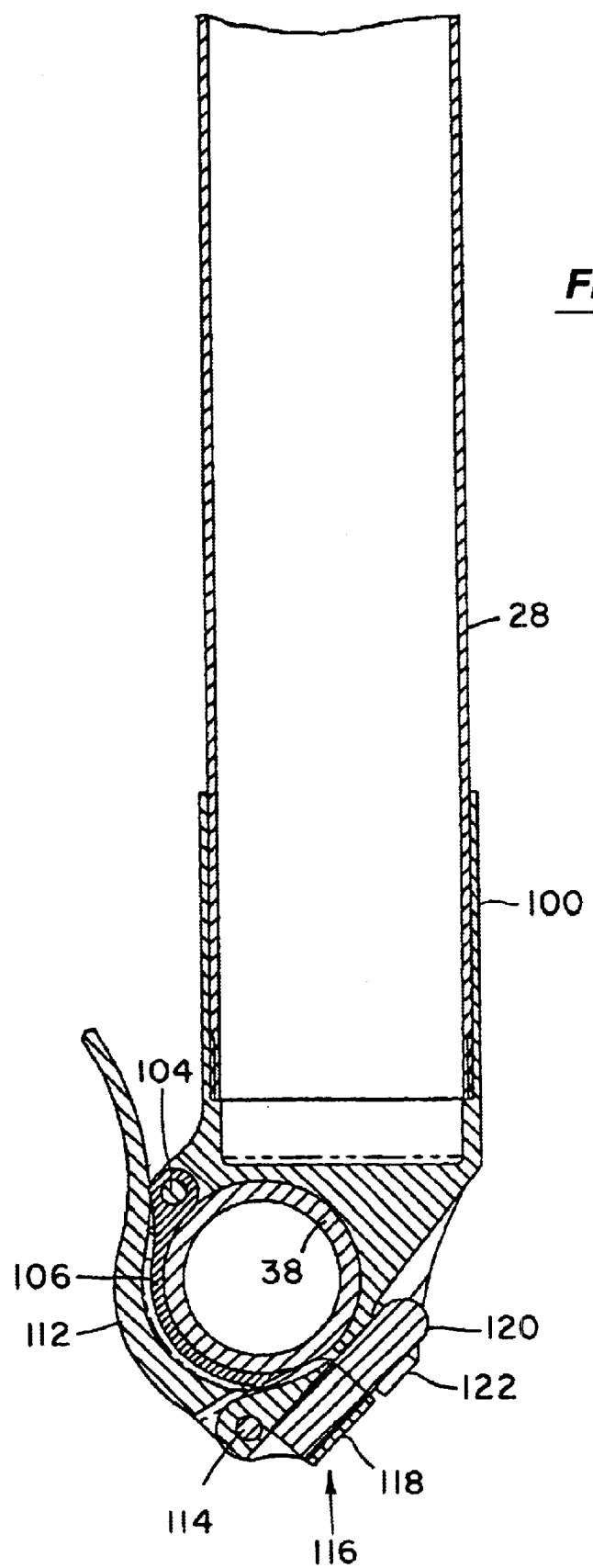
FIG. 12 is a cross sectional side view of the clamp system of FIG. 9.

Frame member 100 includes a shoulder 122 having a slot 124 for receiving hook 120 when clamping wheel axle 38 to frame member 100. In use, wheel 40 (see FIG. 1) may be coupled to inner tube 28 by placing clamp system 34 in an open position as shown in FIGS. 10 and 11. Although not shown, torsion springs may be provided about pivot pins 104 and 110 to hold clamp system 34 in the open position. Wheel axle 38 may then be moved vertically up and placed adjacent inner surface 102. This is made possible by locating cover plate 106 at the top end of inner surface 102. Lever 112 may then be operated to pivot cover plate 106 about the other half of wheel axle 38 and to place hook 120 into slot 124 so that the end of hook is beyond shoulder 122. Lever 112 is then rotated until pivot pin 114 moves to an over center position (i.e., past a line passing between pin 110 and hook 120) and locks cover plate 106 in place where wheel axle 38 is clamped in place by surfaces 102 and 108 as shown in FIG. 12. To adjust the clamping force, hook 120 may be screwed further into or out of housing 118. When ready to remove wheel 40, lever 112 is simply pulled and hook 120 is removed from slot 124. A similar process is used to operate clamp system 36.

Also coupled to frame member 100 is a mount 128 that may be employed to mount a disc brake caliper to clamp system 34. Such a disc brake caliper may be similar to those known in the art, e.g., as defined by the G-3 Shimano disc brake standard.

Figure 13:
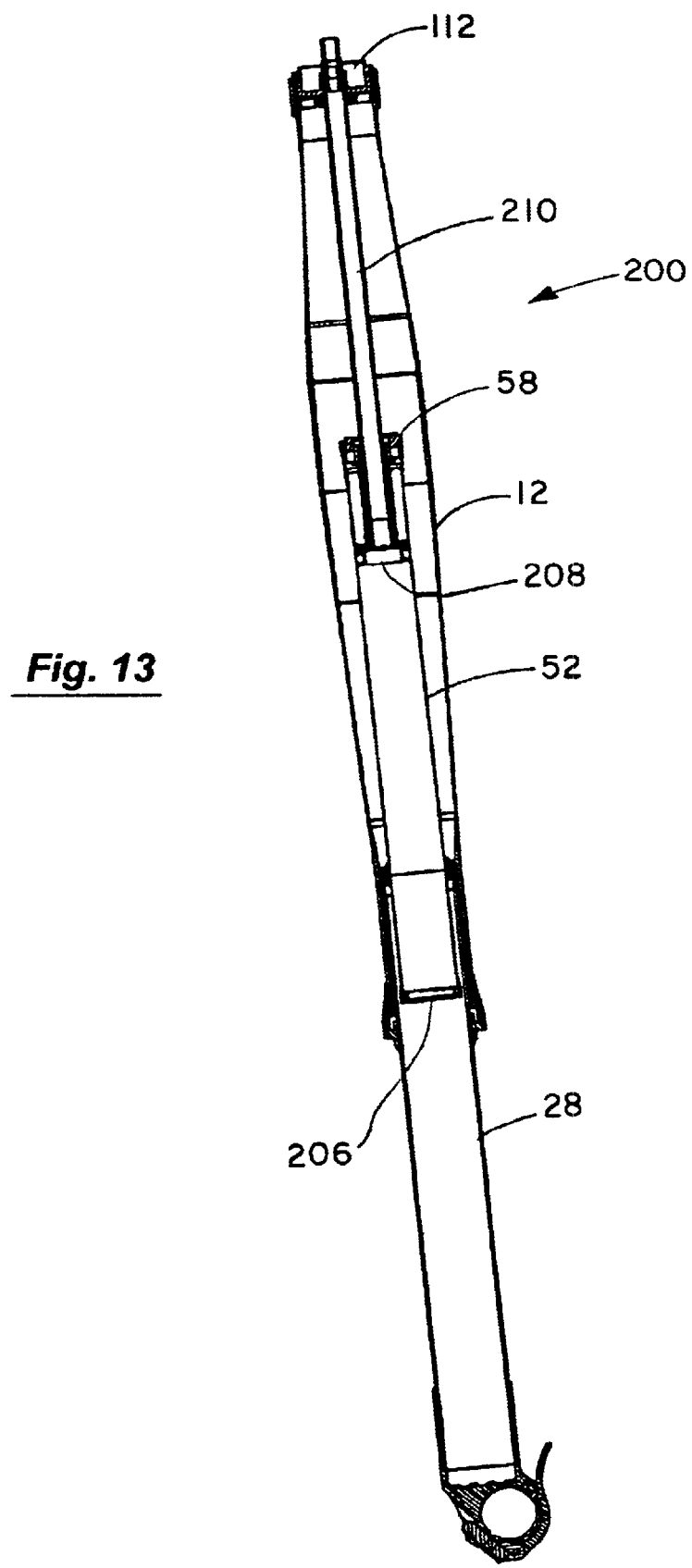
FIG. 13 is a cross-sectional side view of an alternative fork section according to the invention.
Figure 14:
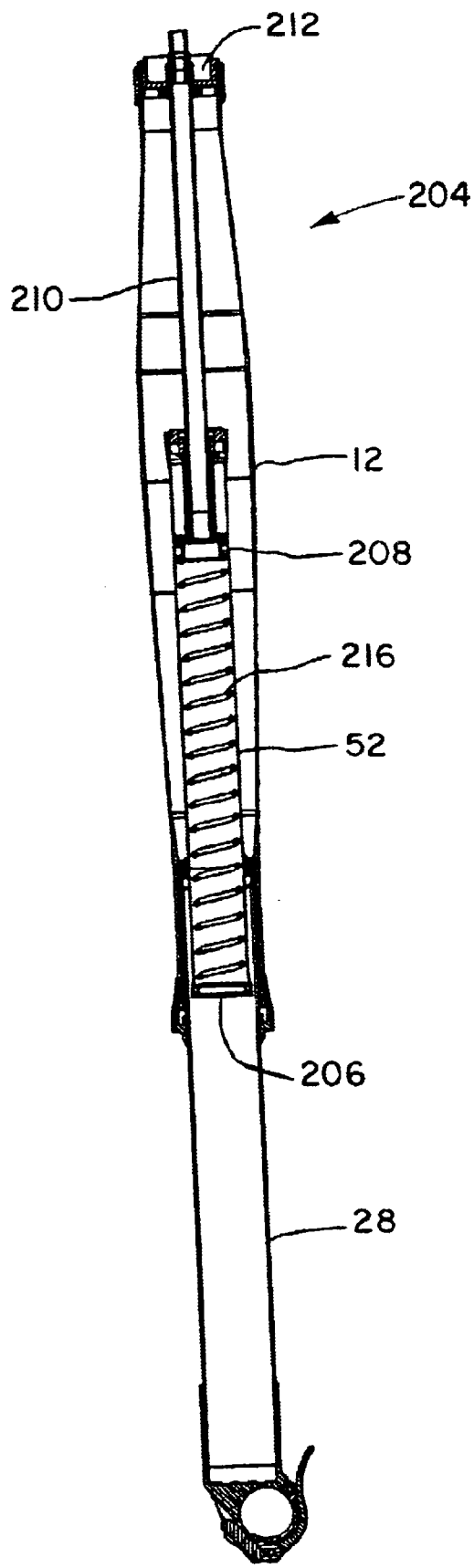
FIG. 14 is a cross-sectional side view of a further embodiment of a fork section according to the invention.

Fork 10 may be modified to include other types of damping systems. Two such examples are illustrated in FIGS. 13 and 14. For convenience of discussion, the elements in FIGS. 13 and 14 that are similar to those described in connection with fork 10 will be described using the same reference numerals. FIG. 13 illustrates a fork section 200 that is constructed of an outer tube 12 that may be connected to the outer tube of another fork section. For example, a fork may be constructed of fork section 200 that is coupled to the outer tube 12 of a fork section 204 (see FIG. 14) in a manner similar to the embodiment illustrated in FIG. 1. Outer tubes 12 may taper outwardly in a manner similar to that previously described.

Slidable within outer tube 12 is inner tube 28 (that is coupled to damper tube 52). In some cases, inner tube 28 and damper tube 52 may be the same tube. Damper tube 52 includes a closed end 206, and a sealed piston 208 is slidable within tube 52. A hollow rod 210 is connected to piston 208 at its bottom end and is coupled to the top of outer tube 12 at its top end. The top end of outer tube 12 includes a valve region 212 into which a valve may be disposed. This valve permits the gas pressure in the space between piston 208 and closed end 206 to be adjusted.

Hence, fork section 200 functions as a damper to dampen a shock experienced by the two wheeled vehicle. More specifically, as inner tube 28 slides into outer tube 12, the gas in damper tube 52 is compressed to provide a damping effect.

Fork section 204 of FIG. 14 is essentially identical to that of fork section 200 but includes a spring 216 that provides a biasing effect. Hence, fork section 204 may be used in combination with fork section 200 to provide a fork having both a damping and biasing effect. More specifically, after the fork experiences a shock and is compressed, spring 216 forces inner tube 28 out of outer tube 14

The invention has now been described in detail for purposes of clarity and understanding. However, it will be appreciated that certain changes and modifications may be practiced within the scope of the appended claims.

What is claimed is:

1. A telescoping fork for the front wheel of a two wheeled vehicle, the fork comprising:
   a pair of outer tubes that each have a top end and a bottom end;
   an upper structural member connecting the outer tubes; and
   a lower structural member connecting the outer tubes, wherein the lower structural member is spaced below the upper structural member, wherein the upper structural member and the lower structural member are configured to be connected to a steering mechanism;
   wherein each outer tube tapers outwardly, both externally and internally, in a direction from the bottom end toward the lower structural member and from the top end toward the lower structural member.

2. A fork as in claim 1, wherein the lower structural member has a hollow box sectional shape.

3. A fork as in claim 1, further comprising a pair of inner tubes disposed to slide within the pair of outer tubes, wherein the inner tubes each have a bottom end and a top end, and wherein the bottom ends of the inner tubes extend out of the bottom ends of the outer tubes and are configured to connect to a wheel axle.

4. A fork as in claim 3, further comprising a single bushing disposed between each outer tube and each inner tube, wherein the bushings are located at the bottom ends of the outer tubes, and wherein the bushings have a length that is longer than a diameter of the inner tube.

5. A fork as in claim 3, further comprising a bracket disposed at the bottom end of each inner tube, wherein the brackets are adapted to clamp a front wheel axle to the inner tubes.

6. A fork as in claim 5, wherein at least one of the brackets has a mount for receiving a disk brake caliper.

7. A fork as in claim 3, further comprising a fluid damping system disposed within at least one of the inner tubes.

8. A fork as in claim 7, wherein the fluid damping system comprises a hollow damper rod coupled to the top end of the outer tube and extending into the inner tube, a sealing member disposed to create a seal between the inner tube and the damper rod near the top end of the inner tube; and a damper piston valve coupled to the damper rod that seals against the inner tube.

9. A fork as in claim 8, wherein the fluid damping system further comprises a lock tube disposed within the damper rod, wherein the damper rod has at least one upper orifice and one lower orifice, and wherein the lock tube is rotatable from the top end of the outer tube to close the lower orifice, and further comprising a sleeve disposed over a top portion of the damper rod and the lock tube, wherein the sleeve is configured to close the upper orifice as the upper tube extends relative to the lower tube, such that further extension is prevented if the lower orifice is closed by the lock tube.

10. A fork as in claim 9, wherein the damper piston valve is a one-way valve that permits fluid flow in an upward direction upon compression of the inner tube into the outer tube.

11. A fork as in claim 8, further comprising a stop positioned between the top of the outer tube and the top of the inner tube to stop compression of the inner tube into the outer tube.

12. A fork as in claim 3, wherein at least one of the inner tubes has a closed end, and further comprising a sealed piston inside the inner tube that is connected to a rod that extends and attaches to the top end of the outer tube, and a gas within the inner tube that is compressed by the piston to provide a biasing effect.

13. A fork as in claim 12, further comprising a spring disposed between the bottom end of the inner tube and the piston to provide a biasing effect.

14. A fork as in claim 12, wherein the rod is hollow to permit the gas pressure in the inner tube to be adjusted by a valve at the top end of the outer tube.

15. A fork as in claim 1, further comprising a handle bar clamping device coupled to the upper structural member.

16. A fork as in claim 1, wherein the upper structural member incorporates a handle bar clamping device.

* * * * *